June 5, 1928.  1,672,430

J. SCHNYDER

ROTARY VALVE FOR PIPE LINES

Filed Jan. 6, 1927  2 Sheets-Sheet 1

Inventor:
Johann Schnyder
Atty.

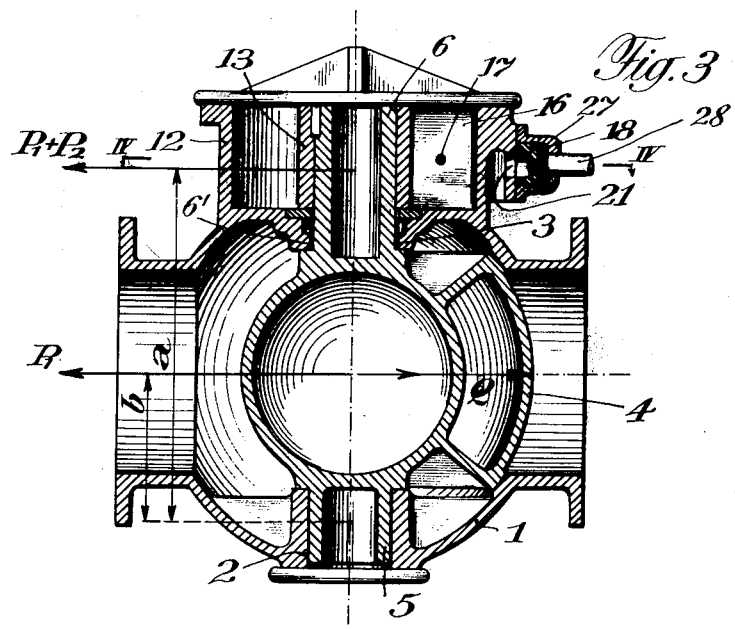
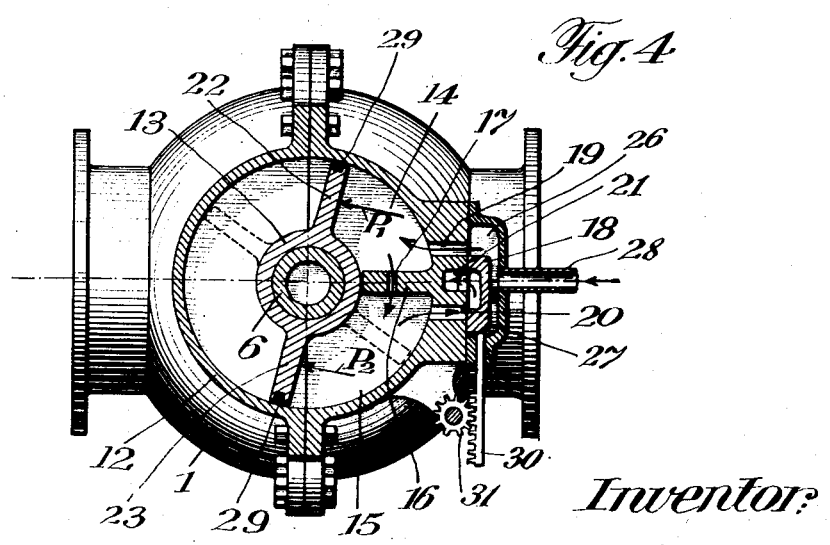

Patented June 5, 1928.

1,672,430

UNITED STATES PATENT OFFICE.

JOHANN SCHNYDER, OF KRIENS-LUZERN, SWITZERLAND, ASSIGNOR TO THE FIRM ACTIENGESELLSCHAFT DER MASCHINENFABRIK VON THEODOR BELL & CIE., OF KRIENS-LUZERN, SWITZERLAND.

ROTARY VALVE FOR PIPE LINES.

Application filed January 6, 1927, Serial No. 159,465, and in Germany July 29, 1925.

The present invention relates to improvements in rotary valves for pipe lines.

Rotary valves for pipe lines are known with which on opening the valve the rotary gate body or a special part of the latter are first lifted off the valve seat by means of special devices before the gate body is turned. When these valves are closed the gate body is first of all turned into the closing position and is then pressed against the valve seat by the water pressure, whereby the desired tight obturation is obtained. This type of rotary valves requires separate operating means for effecting the turning of the gate body and the axial displacement of the gate body or a part thereof, whereby the construction gets complicated and the attendance in emergency cases is rendered difficult.

Further rotary gates are known in which one or both fulcrum pins are mounted in eccentrics for the purpose of lifting the gate body off its seat previous to turning the gate for opening and closing the valve, in order to relieve, either completely or partly, the rotary gate body from water pressure. This type of valves requires two separate devices one of which serves for actuating the eccentric and the other for turning the rotary gate body. For larger sizes two different servo-motors are required for actuating both devices.

With the rotary valve according to the present invention one of the fulcrum pins is mounted with clearance in its bearing to permit a relief of pressure when opening the valve as well as when closing it inasmuch as the device for actuating the gate acts upon the latter through the intermediary of an abutment member fixed to the fulcrum pins in such a manner that previous to the turning of the gate and during that turning the gate is lifted off its seat against the opposing water pressure.

Figure 1:
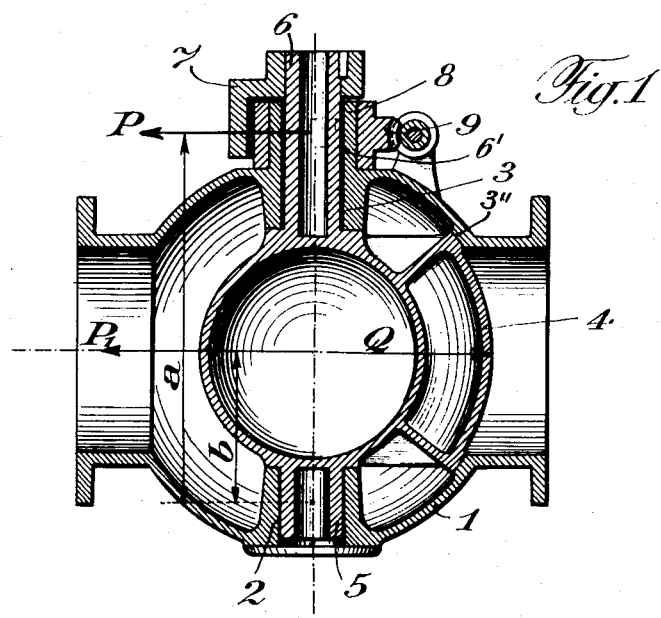
Figure 2:
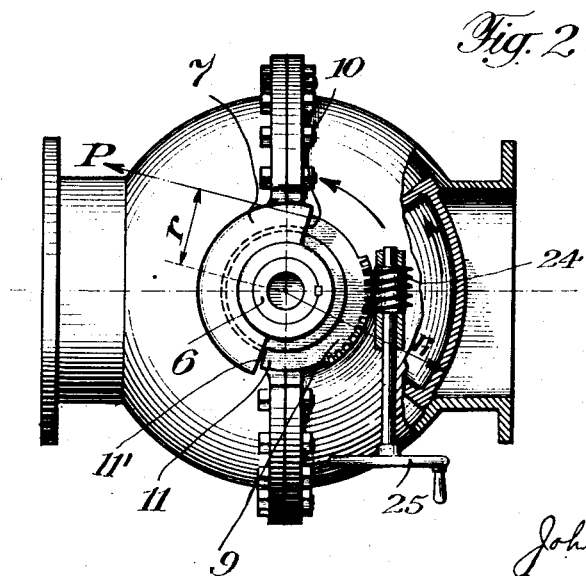

Two constructional examples of the subject matter of the present invention are illustrated on the accompanying drawings, in which:

Fig. 1 is a vertical section of a first constructional example of a mechanically operable valve, Fig. 2 is a plan view of Fig. 1 with parts shown in section, Fig. 3 is a vertical section of a second constructional example provided with means for operating the valve by pressure liquid and Fig. 4 is a plan view of Fig. 3 with parts shown in section along line IV—IV in Fig. 3.

The bipartite valve casing 1 is provided with the two bearing parts 2 and 3, in which the fulcrum pins 5 and 6 of the rotary gate body 4 are rotatably mounted, the gate resting on a seat 3'' of the casing for obturation purposes. The fulcrum pin 6 fits into its bearing 3 with a small clearance 6'. To the fulcrum pin 6 an abutment member 7 is keyed and on the extension 8 of the bearing a segment 9 of a worm wheel is loosely turnable and provided with the two abutment faces 10 and 11. 24 denotes a worm cooperating with the worm wheel segment 9 and 25 is a hand wheel for rotating the worm 24.

In case the valve has to be opened the hand wheel 25 is turned in the anti-clockwise direction whereby the segment 9 turns in the direction indicated by the arrow in Fig. 2; the abutment face 10 of the segment 9 presses against a corresponding face of the abutment member 7; this action generates a turning moment $P.r$ and a pressure $P$ passing through the center of the pin 6. The pin pressure $P$ causes the power $$P_1 = \frac{a}{b} \cdot P$$

acting in the center of the valve and opposing the water pressure $Q$ on the face of the gate body, in this manner a relief of the pressure acting on the seat of the gate body is obtained which equals to $Q-P_1$. The dimensions $a$, $b$ and $r$ may be so chosen that the relief is partial or complete. The lower pin 5 may be provided with a small play in the bearing 2 or it may be spherically shaped to permit the movement of the gate body under the action of the relieving force.

On closing the valve the abutment face 11 bears against the abutment member. Also in this case the force exerted by the face 11 is opposed to the water pressure and causes a relief of the gate body. The clearance 11' present between the faces 10 and 11 and the end faces of the abutment member 7 permits the water pressure to press the gate body against the seat after the gate body has been turned into the closing position and the worm has been slightly turned back.

The constructional example illustrated in Figs. 3 and 4 shows a rotary valve the gate body of which is turned by a servo-motor operated by pressure liquid. The numerals 1, 2, 3, 4, 5, 6 and 6' denote the same parts as in the first constructional example illustrated in Figs. 1 and 2. With the valve casing a casing 12 for a rotary piston is cast in one or it is fixed thereto by screws. In the casing 12 a rotary piston 13 is rotatably mounted having two blades 22 and 23 provided with resilient tightening strips 29 for packing the blades against the casing 12. A stationary partition wall 16 subdivides the space inside the casing 12 and to one side of the blades into an opening chamber 14 and a closing chamber 15. A small hole 17 is provided in the partition wall 16. 19 and 20 denote channels connecting the chambers 14 and 15 with the chamber 26 formed by a chest 27 fixed to the casing 12. Intermediate of the channels 19 and 20 a discharge opening 21 is arranged leading into the open. By means of the pipe 28 pressure liquid is admitted to the chamber 26 and the flow of the liquid through the channels 19, 20 or 21 respectively is controlled by an ordinary slide valve 18 operated by a rack 30 and pinion 31.

Assume the rotary valve to be be closed and the rotary piston 13 to take up the position shown in Fig. 4. If now the valve has to be opened the slide valve 18 is adjusted into the position illustrated in Fig. 4. The pressure liquid entering through the channel 19 fills first of all the chamber 14 and flows then through the hole 17 into the chamber 15. As the pressure liquid in the latter chamber may escape through channel 20 and discharge opening 21 a larger hydraulic pressure is generated in the chamber 14 than in the chamber 15. These two unequal pressures on the two blades of the rotary piston 13 are indicated by the pressures $P_1$ and $P_2$ (Fig. 4). When the valve is almost in its closed position the sum of the forces multiplied by the ration of the lever arms $a/b$ yields a force acting approximately in the center of the valve and being opposed to the water pressure Q. The difference of the forces $P_1 - P_2$ corresponds to the turning moment available for turning the gate body. By suitably choosing and throttling by means of the slide valve 18 the cross-sections of the channels 19 and 20 and of the hole 17 the gate may be partly or wholly relieved of the pressure of the controlled fluid. On closing the valve the opposite movement occurs. When the valve is completely open the blades 22 and 23 are in the position shown in dotted lines in Fig. 4. The slide valve 18 is so displaced that pressure liquid enters chamber 15 through channel 20 and flows through hole 17 into chamber 14, the latter being connected to the open by the channel 19 and opening 21, whereby a force opposed to the water pressure is generated in the manner described above. This force acts as long as liquid pressure is present in the chambers 14 and 15. If the pressure liquid supply is then cut off the gate body is pressed against its seat by the water pressure in the pipe line whereby the desired tightening effect is obtained.

I claim:

1. A rotary valve for pipe lines, comprising in combination, a valve casing provided with a seat and bearings, a gate body having fulcrum pins rotatably mounted on said bearings, one of said pins fitting with play in its bearing, and said gate body being adapted to cooperate with said seat for obturation purposes, means operatively connected to one of said fulcrum pins and adapted to turn said gate body and to cause a pressure on said fulcrum pin which is opposed to the water pressure in the pipe line and lift said gate off its seat previous to causing the turning motion of the gate.

2. A rotary valve for pipe lines, comprising in combination a valve casing provided with a seat and bearings, a gate body having fulcrum pins rotatably mounted in said bearings, one of said pins fitting with play in its bearing, and said gate body being adapted to cooperate with said seat for obturation purposes, a member provided with abutment faces and fixed to said gate body, a second member rotatably mounted about the turning axis of said gate body and having faces adapted to cooperate with said abutment faces of said first mentioned member, play being provided between cooperating faces of said members to permit an adjustment of the gate body against its seat under the influence of the water pressure when closing the valve, and means for imparting a turning motion to said second mentioned member.

3. A rotary valve for pipe lines, comprising in combination, a valve casing provided with a seat and bearings, a gate body having fulcrum pins rotatably mounted in said bearings, one of said pins fitting with play in its bearing, and said gate body being adapted to cooperate with said seat for obturation purposes, a segment shaped member fixed to one of said fulcrum pins and provided with abutment faces, a further segment shaped member rotatably mounted about the turning axes of the gate body and having faces adapted to cooperate with said abutment faces of said first mentioned member, play being provided between cooperating faces of said members to permit an adjustment of the gate body against its seat under the influence of the water pressure when closing the valve, gear teeth being provided on said second segment, and a worm cooperating with said gear teeth.

In testimony whereof, I have signed my name to the specification

JOHANN SCHNYDER.